L. de MARCHESI BISCACCIANTI della Fonte o Fonti.
Friction Gear.

No. 230,884. Patented Aug. 10, 1880.

United States Patent Office.

LUIGI DÉ MARCHESI BISCACCIANTI DELLA FONTE O FONTI, OF ROME, ITALY.

FRICTION-GEAR.

SPECIFICATION forming part of Letters Patent No. 230,884, dated August 10, 1880.

Application filed May 10, 1880. (No model.) Patented in Italy January 31, 1879.

*To all whom it may concern:*

Be it known that I, LUIGI DÉ MARCHESI BISCACCIANTI DELLA FONTE O FONTI, of Rome, in the Kingdom of Italy, have invented a new and useful Friction-Gear, which is fully set forth and described in the following specification.

The invention relates to certain contrivances, being mechanical appliances intended to diminish the friction between the nave of wheels and their axles, or between shafts, pins, rollers, or other axles and their bearings.

The invention consists in the use, for the above purposes, of several rollers inserted between the nave or bearing and the axle or shaft, and will be fully understood by reference to the accompanying drawings, forming part of this specification, in which—

Figure 1:
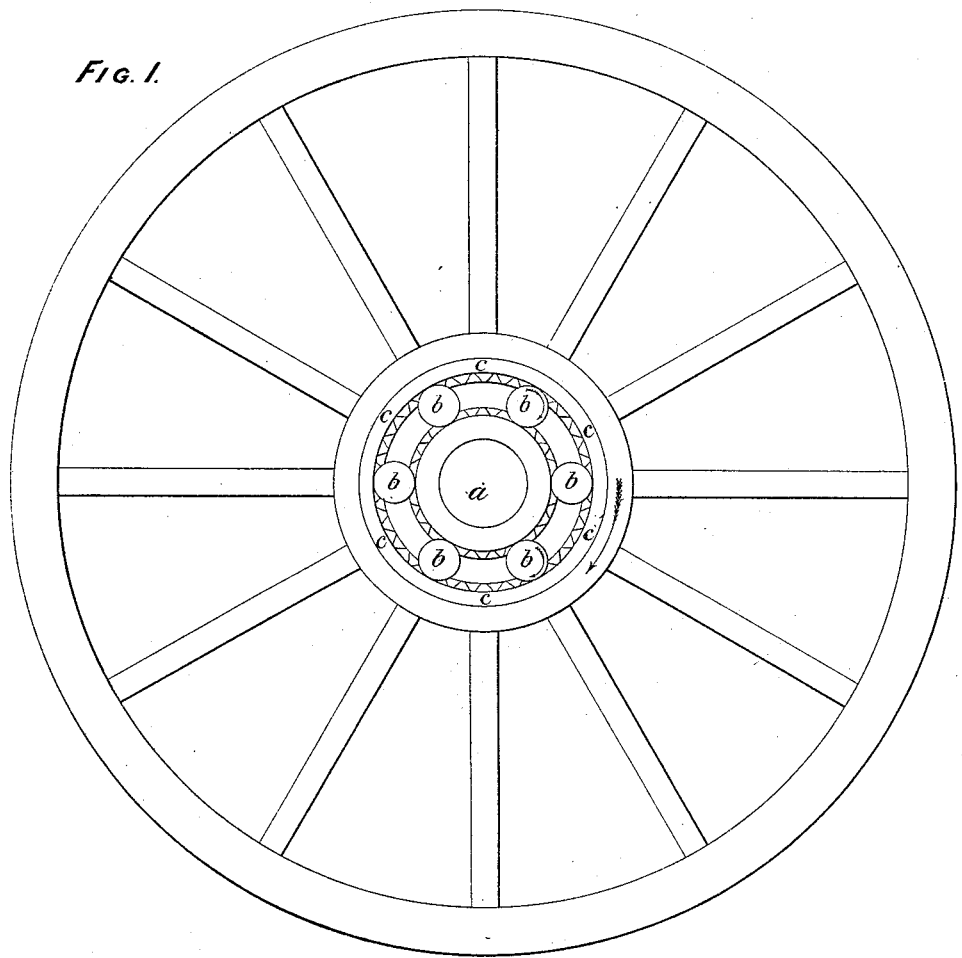
Figure 2:
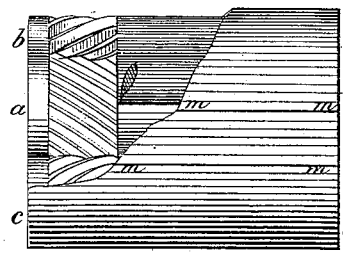
Figures 3, 4:
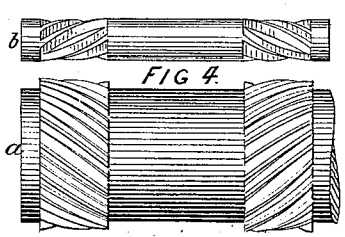
Figure 5:
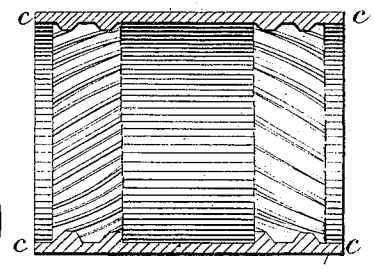

Figure 1 is a side elevation of an axle-nave and wheel treated according to the invention. Fig. 2 is a side view of the nave without the spokes and of the axle and its surrounding or accompanying friction-rollers. Fig. 3 is a side view of a roller; Fig. 4, of an axle or shaft; Fig. 5, section through nave or bearing, showing the internal threaded part.

In all the said figures the same letters are used to represent like parts.

A is the axle or shaft. B are the friction-rollers. C is the nave, made with a side opening, or removable part, *m*, as shown.

The rollers B are made of convenient size and shaped with oblique threads or worm, as shown, intended to work in or on correspondingly-shaped grooves or worms upon the axle A, as shown, and to the internal surface of the nave C. It is not intended that the whole bearing should be wormed, but a part only, as shown. The rollers B are introduced into their place by removing a part of the nave or bearing C, as at *m*.

The oblique thread or worm is intended to preserve the relative positions first given to the said rollers.

The action is as follows: When the wheel, pulley, or other object is rotated it sets all the rollers B in revolution in the direction indicated, the said motion of rollers in regard to the convex surface of axle being analogous to that of a cylinder which rolls freely upon a plane. The same can also be said of the motion of the cylinders or rollers in regard to the internal surface of the nave or bearing.

The contact of the rollers B with the axle A and the internal surface of the bearing C takes place by their respective pitch-lines gearing into one another.

I claim—

A friction-gearing composed of several rollers furnished with oblique pitched teeth or worm devices arranged around an axle or shaft and within a nave or bearing, both furnished with correspondingly-wormed devices, whereby the relative positions of the rollers, axle, and nave are preserved, substantially as illustrated and described.

In testimony whereof I have signed this specification in the presence of two subscribing witnesses.

LUIGI DÉ MARCHESI
    BISCACCIANTI DELLA FONTE O FONTI.

Witnesses:
 GIO. BATTE ROSSI,
 CESARE ROSSI.